United States Patent
Gafford (12)

(10) Patent No.: US 6,553,985 B1
(45) Date of Patent: Apr. 29, 2003

(54) TANK SUPPORT STRUT FOR GRILL

(75) Inventor: Alex T. Gafford, Midland, GA (US)

(73) Assignee: W.C. Bradley Company, Columbus, GA (US)

( * ) Notice: Subject to any disclaimer, the term of this patent is extended or adjusted under 35 U.S.C. 154(b) by 0 days.

(21) Appl. No.: 09/584,123

(22) Filed: May 31, 2000

(51) Int. Cl.⁷ .............................................. F24C 15/00
(52) U.S. Cl. .................... 126/41 R; 126/25 R; 248/133
(58) Field of Search ................................ 126/41 R, 9 R, 126/9 B, 276, 40, 50, 25 R, 39 R, 39 B; 431/344, 343; 248/188.1, 188.8, 127, 129, 130, 133, 146; 99/357, 339, 340, 449

(56) References Cited

U.S. PATENT DOCUMENTS

| | | | |
|---|---|---|---|
| 533,687 A | * 2/1895 | Walker | 248/133 |
| 711,705 A | * 10/1902 | Keen et al. | 248/133 |
| 4,245,505 A | 1/1981 | Baynes | 73/296 |
| 4,322,049 A | * 3/1982 | Holland et al. | 126/25 R |
| 4,356,988 A | * 11/1982 | McIntosh | 126/41 R |
| 4,413,515 A | 11/1983 | Quinn | 73/296 |
| 4,544,173 A | * 10/1985 | Kellermyer | 248/129 |
| 5,408,985 A | 4/1995 | Giebel et al. | 126/41 R |
| 5,458,309 A | 10/1995 | Craven, Jr. et al. | 248/231.9 |
| 5,873,355 A | 2/1999 | Schlosser et al. | 12/41 R |
| 5,931,149 A | * 8/1999 | Lewis | 126/41 R |

FOREIGN PATENT DOCUMENTS

FR 2614400 A * 10/1988 ............... 126/41 R

* cited by examiner

*Primary Examiner*—Henry Bennett
*Assistant Examiner*—Josiah C. Cocks
(74) *Attorney, Agent, or Firm*—James W. Kayden; Thomas, Kayden, Horstemeyer & Risley LLP

(57) ABSTRACT

A preferred embodiment incorporates a grill casting support assembly which includes a tank support strut mounted thereto. The tank support strut is configured to mount an LP gas tank thereon and preferably is configured with a first end and a second end and first and second support surfaces spaced therebetween. Each of the first and second support surfaces are adapted to engage a portion of the LP gas tank, with the tank support strut being engagable with the LP gas tank in a receiving position and a mounted position. In the receiving position, the LP gas tank can be arranged in a substantially horizontal orientation so that it contacts the first and second support surfaces, and, in the mounted position, the LP gas tank is arranged in a substantially upright orientation so that it contacts the first and second support surfaces. Preferably, a grill casting is mounted to the grill casting support assembly.

5 Claims, 2 Drawing Sheets

TANK SUPPORT STRUT FOR GRILL

BACKGROUND OF THE INVENTION

1. Field of the Invention

The present invention relates generally-to barbecue grills and, more particularly, to tank supports for use with gas-fired grills, such as barbecue grills, for instance, that facilitate convenient mounting and dismounting of gas supply tanks to the grills.

2. Description of the Related Art

Gas-fired grills, such as barbecue grills, for instance, commonly are mounted on wheeled carts and are fueled by LP gas, such as liquid propane gas, from a tank mounted on the cart. Typically, an LP gas tank is mounted on a supporting strut or on a lower shelf of the cart, usually at one end or the other of the cart, thereby providing easy access for removing and replacing the tank. When a tank has been emptied, it is disconnected from a gas regulator hose assembly and removed from its mounted position upon the cart and then typically is transported to a refilling station. After the tank has been refilled, it is then remounted beneath and to one side of the grill and reconnected to the gas regulator hose assembly. The grill may then be utilized for barbecuing once again.

Many grills include a means for securing the LP gas tank to the barbecue grill cart. This is typically accomplished by seating the LP gas tank on a strut or on the bottom shelf assembly of the grill cart in any suitable manner, such as with mounting clips. Additionally, the top of the tank may then typically secured with one or more clips, springs, or other means, such as disclosed in U.S. Pat. No. 5,458,309, issued to Craven, Jr. et al. Other methods used for securing LP gas tanks to grill carts include encircling the LP gas tank with a belt or strap, as disclosed in U.S. Pat. No. 4,949,701, issued to Krosp et al, and U.S. Pat. No. 4,984,515, issued to Pivonka, respectively, and mounting the LP gas tank upon clips supported upon a leg of the grill cart, as disclosed in U.S. Pat. No. 5,076,252, issued to Schlosser et al.

Although the prior art teaches what appear to be relatively simple methods of removing and/or securing LP gas tanks to barbecue grill carts, there are certain disadvantages in the prior art. These disadvantages include the necessity to lift the emptied tank vertically until it is clear of its support surface, and then move the tank horizontally away from the grill cart assembly. This operation typically takes place in relatively tight quarters due to the almost universal side shelves which are common on grill cart assemblies. Such grill carts then require the person wishing to replace the LP gas tank upon the grill cart to lift a filled gas tank vertically from the ground and then move the filled tank horizontally in order to place the tank upon either a support surface, such as a shelf or strut which is arranged below the grill assembly, or a clip assembly which is supported by a leg of the grill cart. Such tanks.typically weigh approximately forty (40) pounds when filled.

Additionally, when replacing a tank which is mounted on a clip assembly, as described above, the bottom shelf or struts of the grill cart cannot be utilized to partially support the LP gas tank during the time in which the tank is being secured to the cart. Moreover, some of the prior art mounting clips engage both the bottom rim of the LP gas tank and the carrying handle arranged in the.upper collar of the LP gas tank, thus necessitating lifting and securing of the tank without the benefit of using the tank handle.

Therefore, there exists a need for improved tank supports which address these and other shortcomings of the prior art.

SUMMARY OF THE INVENTION

The present invention relates generally to gas-fired grills. In a preferred embodiment, the grill incorporates a grill casting support assembly which includes a tank support strut mounted thereto. The tank support strut is configured to mount an LP gas tank thereon and preferably is configured with a first end and a second end and first and second support surfaces spaced therebetween. Each of the first and second support surfaces are adapted to engage a portion of the LP gas tank, with the tank support strut being engagable with the LP gas tank in a receiving position and a mounted position. In the receiving position, the LP gas tank can be arranged in a substantially horizontal orientation so that it contacts the first and second support surfaces, and, in the mounted position, the.LP gas tank is arranged in a substantially upright orientation so that it contacts the first and second support surfaces. Preferably, a grill casting is mounted to the grill casting support assembly.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

Figure 1:
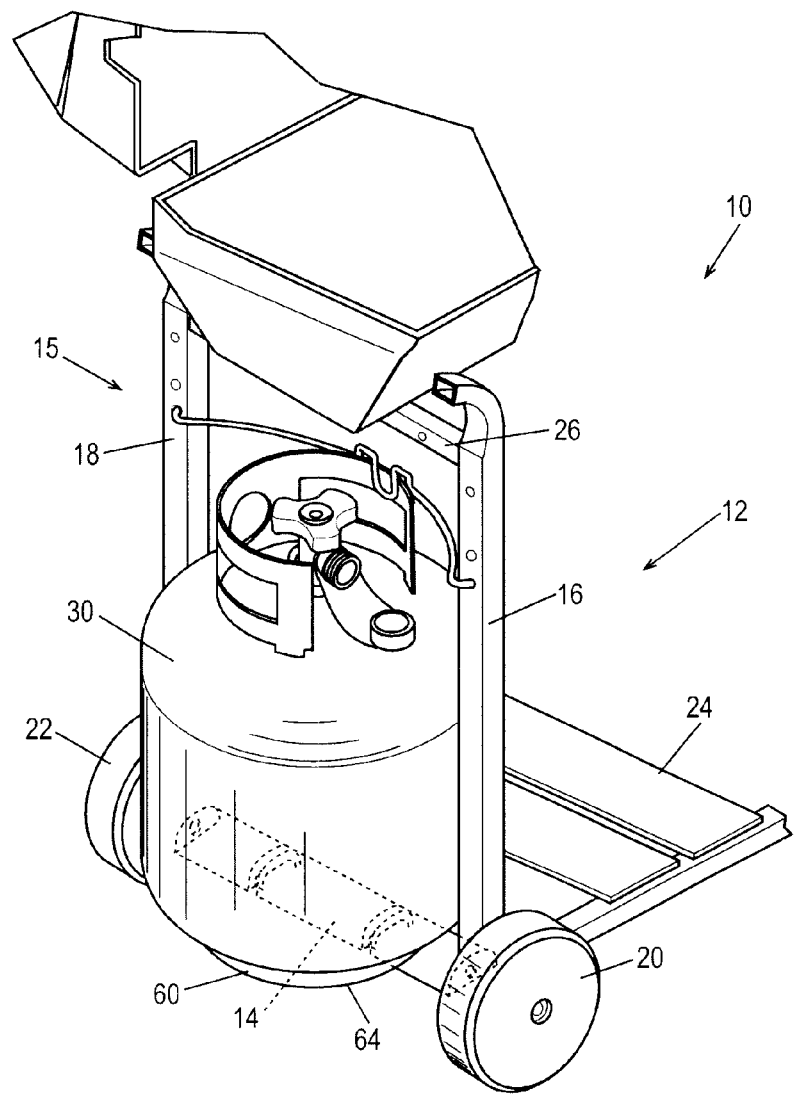
FIG. 1 is a partially cut away, perspective view of a preferred embodiment of the present invention.

Reference will now be made in detail to the description of the invention as illustrated in the drawings with like numerals indicating like parts throughout the several views. As shown therein, FIG. 1 depicts a grill assembly 10 incorporating a cart assembly 12, which includes a preferred embodiment of the tank support strut 14 of the present invention. Although the present invention may be utilized with grills incorporating various grill casting support structure configurations, such as pedestal-type, and other cartless-type structures, the present invention will be described herein in relation to a carted grill for ease of description and not for the purpose of limitation. It should be noted that incorporation of the tank support strut 14 into other types of grill casting support structures is considered well within the scope of the present invention.

In general, cart assembly 12 incorporates two leg assemblies, one of which (leg assembly 15) is shown, with one of the leg assemblies typically incorporating wheels. Wheeled leg assembly 15 includes front leg 16 and rear leg 18 with tank support strut 14 interconnected therebetween. Wheels 20 and 22 are connected to the cart legs 16 and 18, respectively, to provide mobility to the grill cart, as is well known in the art. Bottom shelf assembly 24 and upper strut 26 also are connected to the cart leg assemblies to complete the cart assembly, thereby forming a rugged structure which serves to both support and transport grill assembly 10.

Figure 2:
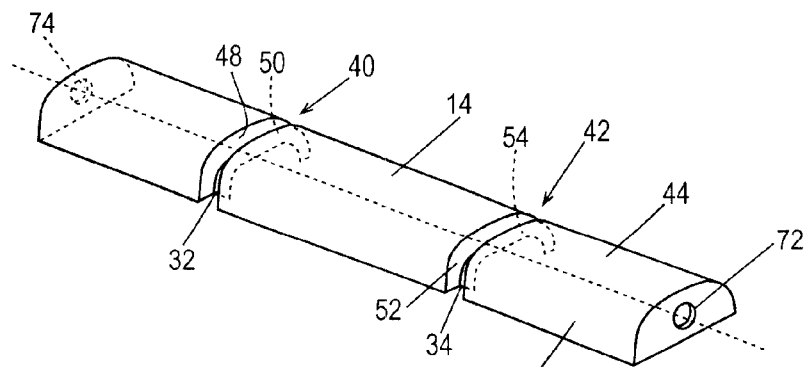
FIG. 2 is a perspective view of a preferred embodiment of the present invention.
Figure 3:
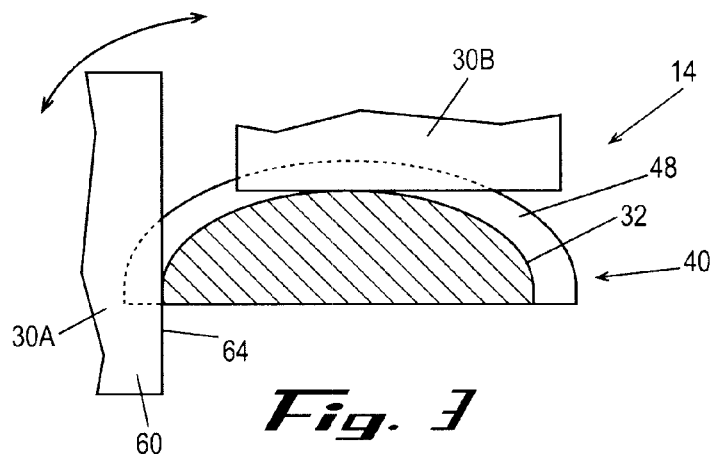
FIG. 3 is a cross-sectional end view of a preferred embodiment of the present invention.

As shown in FIGS. 1 and 2, a preferred embodiment of the tank support strut 14 is configured as a elongated member which may be formed of steel or other suitable materials which are capable of providing.suitable support to a gas supply tank 30. Preferably, tank support strut 14 incorporates a pair of support surfaces 32 and 34, respectively, which in a preferred embodiment are arcuately shaped when viewed in cross-section (FIG. 3). In the embodiment depicted in FIG. 2, the respective support surfaces form the bases of respective channels 40 and 42, with the channels preferably extending at least along an upper surface 44 and a side surface 46 of the tank support strut, although, in some embodiments, the channels may extend merely along an upper surface of the of the strut. The channels 40 and 42 also are defined by spaced side walls, 48 and 50, and 52 and 54, respectively, which are sufficiently spaced from each other to allow the channels to receive opposing portions of the base 60 of a gas supply tank 30 so that the lower surface 64 of the base 60 may-engage each of the support surfaces 32 and 34 of the tank support strut.

Figure 4:
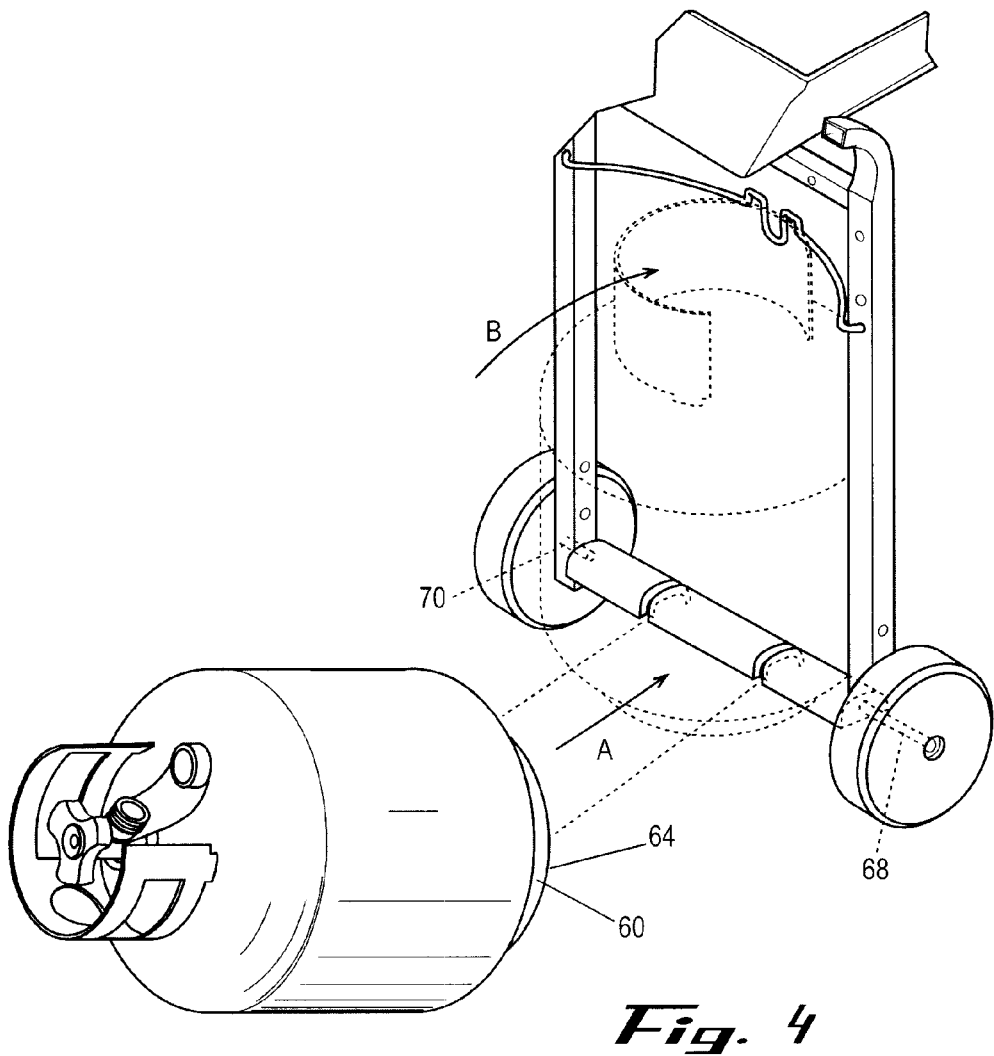
FIG. 4 is a partially cut-away, perspective view of a preferred embodiment of the present invention depicting a preferred method of installing a gas supply tank onto a grill cart.

In the preferred embodiment depicted in FIGS. 2 and 4, strut 14 is mounted between legs 16 and 18 of the grill cart by axles 68 and 70 of the wheels 20 and 22. As shown in FIG. 2, the axles are adapted to be received within recesses 72 and 74 formed in the end walls of the strut.

Gas supply tanks, such as LP gas tanks, typically incorporate a tank collar which is normally welded to the upper portion of the gas tank, and a base which is normally is welded to the lower portion of the tank. The tank collar typically is constructed in a circular shape so as to protect an LP gas valve to which a gas regulator hose assembly (not shown) is attached for the purpose of conveying LP gas from the tank to a burner unit (not shown). It is common practice that the tank collar also doubles has a carrying handle for transporting the tank to refilling stations, and for returning the gas tank to the barbecue grill cart assembly for reinstallation.

As depicted in FIGS. 3 and 4, LP gas tank 30 can be supported by the strut 14 both during and after installation. For example, when the gas tank has been emptied, it is typically disconnected from the gas regulator hoes assembly (not shown) and any associated securing means, such as a tank holding wire or other conventional means. The tank is then removed from its mounted position, such as depicted in FIG. 1 and by tank 30B of FIG. 3, upon the tank support strut by tilting the tank outwardly toward a horizontal position, depicted by tank 30A of FIG. 3. A filled tank is then placed on its side adjacent the tank support strut (FIG. 4). The tank is then moved laterally in direction A toward the strut until the lower rim 64 of the base 60 of the tank engages the strut, with the lower rim engaging each support surface of the tank support strut. Once so engaged, the gas tank may be conveniently rotated upwardly and inwardly toward the cart assembly in direction B to a mounted position so that the tank is arranged in a substantially vertical or upright orientation upon the strut, such as shown in phantom lines. Any securing means, i.e. wire, can then be reattached to the tank in order to maintain the tank in a substantially upright position, thereby functioning as a locking mechanism for substantially maintaining the tank in its mounted position. Typically, the tank is then reconnected to the gas regulator hose assembly (not shown).

As depicted in FIG. 3, movement of the gas tank from the receiving position to the mounted position is facilitated by the support surface of the tank support strut as it provides a suitable surface about which the tank may be rotated. Additionally, engagement of the lower rim of the LP gas tank within the channels of the tank support strut assists in maintaining the lateral position of the tank relative to the strut, thereby assisting proper tank placement during installation and removal. Thus, in a preferred embodiment, the channels (i.e., channels 40 and 42) of the tank support strut are arranged so that engagement of the lower rim of the LP gas tank within at least a portion of the channels is achievable when the tank is in its receiving (substantially horizontal) position.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A grill for use with an LP gas tank, said grill comprising:

a grill casting support assembly having a tank support strut non-rotatably mounted thereto, said tank support strut being configured to mount an LP gas tank thereon, said tank support strut having a first end and a second end and first and second support surfaces spaced therebetween, each of said first and second support surfaces being adapted to engage a portion of the LP gas tank, said tank support strut being engagable with the LP gas tank in a receiving position and a mounted position such that in said receiving position the LP gas tank is arranged in a substantially horizontal orientation and contacting said first and second support surfaces, and in said mounted position the LP gas tank is arranged in a substantially upright orientation and contacting said first and second support surfaces; and a grill casting mounted to said grill casting support assembly.

2. The grill of claim 1, wherein each of said first and second support surfaces are arcuately shaped as viewed in a cross-sectional end view.

3. The grill of claim 1, wherein said tank support strut has first and second channels, said first support surface being configured as a base of said first channel, and said second support surface support surface being configured as a base of said second channel.

4. The grill of claim 1, wherein said grill casting support assembly is a grill cart assembly having a first leg assembly, said first leg assembly having a front leg and a rear leg, and wherein said tank support strut is mounted between said front leg and said rear leg.

5. The grill of claim 3, wherein said tank support strut has an upper surface configured to face the LP gas tank in said mounted position, and a side surface configured to face the LP gas tank in said receiving position, and wherein said first and second channels extend along at least a portion of said upper surface and at least a portion of said side surface such that said first and second channels are engagable with the LP gas tank in said receiving position and said mounted position.

\* \* \* \* \*